(12) United States Patent
Takasuka et al.

(10) Patent No.: US 7,064,898 B1
(45) Date of Patent: Jun. 20, 2006

(54) OPTOELECTRONIC DEVICE

(75) Inventors: Shoichi Takasuka, Osaka (JP); Shin'ichi Ijima, Osaka (JP); Hideyuki Nakanishi, Shiga (JP); Akio Yoshikawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 98 days.

(21) Appl. No.: 10/129,809

(22) PCT Filed: Nov. 8, 2000

(86) PCT No.: PCT/JP00/07871

§ 371 (c)(1),
(2), (4) Date: Aug. 2, 2002

(87) PCT Pub. No.: WO01/35400

PCT Pub. Date: May 17, 2001

(30) Foreign Application Priority Data

Nov. 9, 1999  (JP)  ................................. 11/317626

(51) Int. Cl.
*G02B 5/18* (2006.01)
*G02B 27/44* (2006.01)

(52) U.S. Cl. .................................. 359/566; 369/112.04

(58) Field of Classification Search ................ 359/566, 359/569, 575; 369/112.03, 112.04, 112.06, 369/112.07, 112.08, 112.11, 112.12, 112.13
See application file for complete search history.

(56) References Cited

U.S. PATENT DOCUMENTS

| | | | | |
|---|---|---|---|---|
| 5,391,865 A | 2/1995 | Kurata et al. | ............. | 250/201.5 |
| 5,555,334 A | 9/1996 | Ohnishi et al. | ............... | 385/93 |
| 5,687,153 A * | 11/1997 | Komma et al. | ........ | 369/112.12 |
| 5,790,504 A | 8/1998 | Hayashi et al. | ......... | 369/112.12 |
| 6,084,710 A | 7/2000 | Katsuma | ..................... | 359/569 |
| 6,154,433 A * | 11/2000 | Hoshino et al. | ....... | 369/112.04 |
| 6,327,110 B1 * | 12/2001 | Sano et al. | .............. | 360/77.03 |
| 6,388,977 B1 * | 5/2002 | Sakai et al. | ............ | 369/112.12 |

FOREIGN PATENT DOCUMENTS

| | | |
|---|---|---|
| JP | 2-79230 | 3/1990 |
| JP | 2-193333 | 7/1990 |
| JP | 4-95233 | 3/1992 |
| JP | 4-349687 | 12/1992 |
| JP | 5-226676 | 9/1993 |
| JP | 6-243502 | 9/1994 |
| JP | 9-102650 | 4/1997 |
| JP | 10-208275 | 8/1998 |
| JP | 10-255309 | 9/1998 |
| JP | 10-300913 | 11/1998 |

* cited by examiner

*Primary Examiner*—Alessandro Amari
(74) *Attorney, Agent, or Firm*—Hamre, Schumann, Mueller & Larson, P.C.

(57) ABSTRACT

An optoelectronic device that provides an excellent reproduction signal and a stable servo control while preventing deterioration of S/N ratio caused by stray light. The optoelectronic device has a semiconductor laser (101) that emits light beams on an information-recording medium (105), a hologram optical element (102) having a diffraction grating region (108) and located between the semiconductor laser (101) and the information-recording medium (105), and a photodetector (106) for receiving light that is diffracted at the diffraction grating region (108) of the hologram optical element (102), among returning light beams from the information-recording medium (105), and the optoelectronic device has also a diffraction grating region (107) in the vicinity of the diffraction grating region (108) of the hologram optical element (102) so as to prevent stray light other than diffracted light from the diffraction grating region (108) from entering the photodetector (106).

16 Claims, 19 Drawing Sheets

FIG. 18 *PRIOR ART*

OPTOELECTRONIC DEVICE

TECHNICAL FIELD

The present invention relates to an optoelectronic device for an optical head unit used as a main part of an optical information processor to apply light for recording, reproducing and erasing information. Specifically, the present invention relates to an optoelectronic device that divides a beam of light emitted from a light source into plural light beams using a light-beam-dividing means, and detects reproduction signals and various servo signals by means of the divided light beams.

BACKGROUND ART

Structures and operations of a conventional optoelectronic device are described below referring to FIGS. 17, 18 and 19.

FIG. 17 shows a cross section of an optical system and an information-recording medium of a conventional optoelectronic device. In FIG. 17, a broken line indicates how a light beam emitted from a semiconductor laser 1 and a light beam reflected at an information-recording medium 5 spread. In FIGS. 17 and 19, cross sections are not hatched for specifically indicating the light paths.

The light beam emitted from the semiconductor laser 1 as a light source enters a hologram optical element 2 having a diffraction grating region 8 as shown in FIG. 18. The $0^{th}$-order diffracted light is converged on the information-recording medium 5 by a collimator lens 3 and an objective lens 4, and reflected. The light beam reflected on the information-recording medium 5 is guided by the objective lens 4 and the collimator lens 3 to the diffraction grating region 8 of the hologram optical element 2. The reflected light is diffracted again there so that the ±first-order diffracted light enters photodetectors 6. The reflected light beam guided to the photodetector 6 is detected and calculated so as to detect a reproduction signal and various servo signals.

In FIG. 17, an alternate long and short dash line indicates an optical axis 10 of the light emitted from the semiconductor laser 1. FIG. 18 shows an effective light beam 9 of the emitted light passing through the diffraction grating region 8.

In the above-identified conventional optoelectronic device, various signals are detected by selecting among light beams emitted from the semiconductor laser 1, exclusively $0^{th}$-order diffracted light that passes through the hologram optical element 2.

However, a part of the emitted light entering the hologram optical element 2 is subject to ±first-order diffraction and mixed with the $0^{th}$-order diffracted light. That is, as shown in FIG. 19, a part of the ±first-order diffracted light is converged on the information-recording medium 5 and reflected to return to a region where the diffraction grating region 8 is not formed on the hologram optical element 2, and it passes through the hologram optical element 2 so as to enter the photodetectors 6. For clarification, FIG. 19 shows only +first-order diffracted light received by the photodetector 6, among +first-order light beams that are generated at the diffraction grating region 8.

In other words, since a light beam other than the normal signal light (the $0^{th}$-order diffracted light of a light beam emitted from the semiconductor laser 1) becomes stray light 20 to enter the photodetector 6, a signal/noise ratio (S/N ratio) deteriorates during reproduction of the information-recording medium 5, resulting in degradation in the reproduced signal and instability of the various servo controls.

In view of the above problems, the object of the present invention is to provide an optoelectronic device that obtains an excellent reproduction signal while allowing a stable servo control by providing a means for preventing deterioration of the S/N ratio caused by stray light.

DISCLOSURE OF INVENTION

For achieving the above-noted object, the present invention provides an optoelectronic device comprising a light emitter for emitting light beams on a reflection medium, a light-beam-dividing element having a diffraction grating region and located between the light emitter and the reflection medium, and a photodetector for receiving light that is reflected at the reflection medium and diffracted at the diffraction grating region of the light-beam-dividing element, wherein the light-beam-dividing element comprises a stray-light-removing region in the vicinity of the diffraction grating region, and the stray-light-removing region prevents stray light from entering the photodetector, where the stray light is other than diffracted light from the diffraction grating region, among returning light beams reflected of the reflection medium.

In this structure, a stray-light-removing region is provided in the vicinity of the diffraction grating region of a light-beam-dividing element. Accordingly, ±first-order diffracted light (stray light) that is generated during emitted light passing through the diffraction grating region is prevented from entering the photodetector via a region other than the diffraction grating region of the light-beam-dividing element. This can prevent deterioration of the S/N ratio and serve to provide an optoelectronic device that can provide a reproduction signal of improved quality and a stable servo control.

It is preferable in the structure that the stray-light-removing region of the light-beam-dividing element is a shielding region.

Accordingly, stray light entering a region other than the diffraction grating region of the light-beam-dividing element will be shielded by this shielding region in order not to enter the photodetector.

It is further preferable in the structure that the shielding region is formed of a material that absorbs the returning light beam.

Or it is preferable in the structure that the shielding region is formed of a material that reflects the returning light beam.

It is further preferable that the material of the shielding region is a metal.

It is preferable in the structure that the stray-light-removing region is formed with a diffraction grating having a $0^{th}$-order diffraction efficiency of the reflected light beam that is 5% or less.

Accordingly, substantially all the stray light entering a region other than the diffraction grating region of the light-beam-dividing element is diffracted without passing through the diffraction grating at the stray-light-removing region so as not to enter the photodetector.

It is preferable in the structure that the diffraction grating that forms the stray-light-removing region has a convexity and a concavity that are different from each other in the optical path length by m/2 times a wavelength of the reflected light, where m denotes an odd number.

Accordingly, the $0^{th}$-order diffraction efficiency of the diffraction grating at the stray-light-removing region can be suppressed to a remarkably low level.

It is preferable in the structure that the optoelectronic device comprises a plurality of photodetectors, each of which is located between a spot of $m^{th}$-order diffracted light and a spot of $(m+1)^{th}$-order diffracted light of the returning light beam provided by the diffraction grating of the stray-light-removing region located in an optical axis direction of the returning light beam with respect to the other photodetector, where m denotes an integer.

Accordingly, a higher-order diffracted light (diffracted light other than $0^{th}$-order diffracted light) provided by the diffraction grating of the stray-light-removing region is prevented from entering the photodetectors, and thus, deterioration of S/N ratio can be suppressed more effectively.

It is preferable in the structure that the light-beam-dividing element has a lens at a side opposite to the light emitter, and the stray-light-removing region is provided so as to stisfy the following formula:

$$r > d \cdot \tan(\sin^{-1}(NA))$$

where 'd' denotes an air conversion distance from a light-emitting point of the light emitter to a face of the light-beam-dividing element where the diffraction grating region and the stray-light-removing region are formed, NA denotes a numerical aperture of one side of the lens facing the light-beam-dividing element, and 'r' denotes a distance to an arbitrary point P on the stray-light-removing region from an intersection of an optical axis of the light beam provided by the light emitter and a face of the light-beam-dividing element at the stray-light-removing region side.

Accordingly, since a light beam that is emitted from the light emitter and enters the lens will not be shielded with the stray-light-removing region, a light beam from the light emitter can be used efficiently, and the light beam can be irradiated efficiently on a reflection medium.

It is preferable in the structure that at least one part of the photodetector is present in a region obtained by projecting the stray-light-removing region along with the optical axis of the returning light beam.

It is also preferable in the structure that the diffraction grating region and the stray-light-removing region are located adjacent to each other with no spacing.

Accordingly, stray light that may enter the photodetector from any regions other than the diffraction grating region of a light-beam-dividing element can be removed efficiently.

It is preferable in the structure that a three-beam-generating diffraction grating is provided in an optical path between the light emitter and the light-beam-dividing element.

Accordingly, a tracking servo signal can be detected by a three-beam method, whereby an optoelectronic device with a stable servo control can be provided.

It is preferable in the structure that the light emitter, the photodetector and the light-beam-dividing element are provided within one single package.

Accordingly, reduction in size and thickness of the optoelectronic device as well as reduction in cost can be achieved.

It is preferable in the structure that the light emitter and the photodetector are integrated on one substrate, the substrate is located inside the package, and the package is sealed with a member provided with the light-beam-dividing element.

Accordingly, the light emitter and the photodetector can be protected from any external influences such as changes in temperature and humidity, and dust pollution.

It is preferable in the structure that the light emitter is an end-face light emitter, the substrate has a concavity with a bottom on which the light emitter is located while the side face of the concavity comprises a mirror inclined about 45° with respect to the bottom so as to reflect light beams emitted from the light emitter.

Accordingly, an end-face light emitter, which is less expensive than a face light emitter, can be used for cost reduction.

It is preferable in the structure that the optoelectronic device comprises a monitor element for receiving light beams emitted from the light emitter toward a side opposite to the mirror and adjusting the output of the light emitter.

Accordingly, the output of the light emitter can be adjusted, whereby power consumption is reduced.

It is preferable in the structure that an integrated circuit for processing an electric signal from the photodetector is mounted on the substrate.

Accordingly, external noises caused by wire-routing can be reduced when compared to a case of providing a circuit for processing electric signals outside the substrate and connecting by wires. As a result, the obtained optoelectronic device will have a further improved S/N ratio.

It is preferable in the structure that the three-beam-generating diffraction grating and the light-beam-dividing element are integrated in one optical member.

Accordingly, reduction in size and thickness of the optoelectronic device as well as reduction in cost can be achieved.

It is preferable in the structure that the optoelectronic device comprises a polarized-light-beam-dividing means for dividing a part of light reflected by the reflection medium, a reflector for reflecting light divided by the polarized-light-beam-dividing means, a polarized-light-separating means for separating light reflected by the reflector, and a polarization-signal-detecting light-receiving means for detecting light separated by the polarized-light-separating means.

Accordingly, the optoelectronic device can be used for detecting photo-magnetic signals.

It is preferable in the structure that the polarized-light-beam-dividing means, the reflector and the polarized-light-separating means are formed integrally as one optical member.

Accordingly, reduction in size and thickness of the optoelectronic device as well as reduction in cost can be achieved.

BEST MODE FOR CARRYING OUT THE INVENTION

Embodiments of the present invention are described below referring to the attached drawings. In the cross-sectional views referred to in the description, hatching is omitted for specifying the optical paths.

First Embodiment

Figure 1:
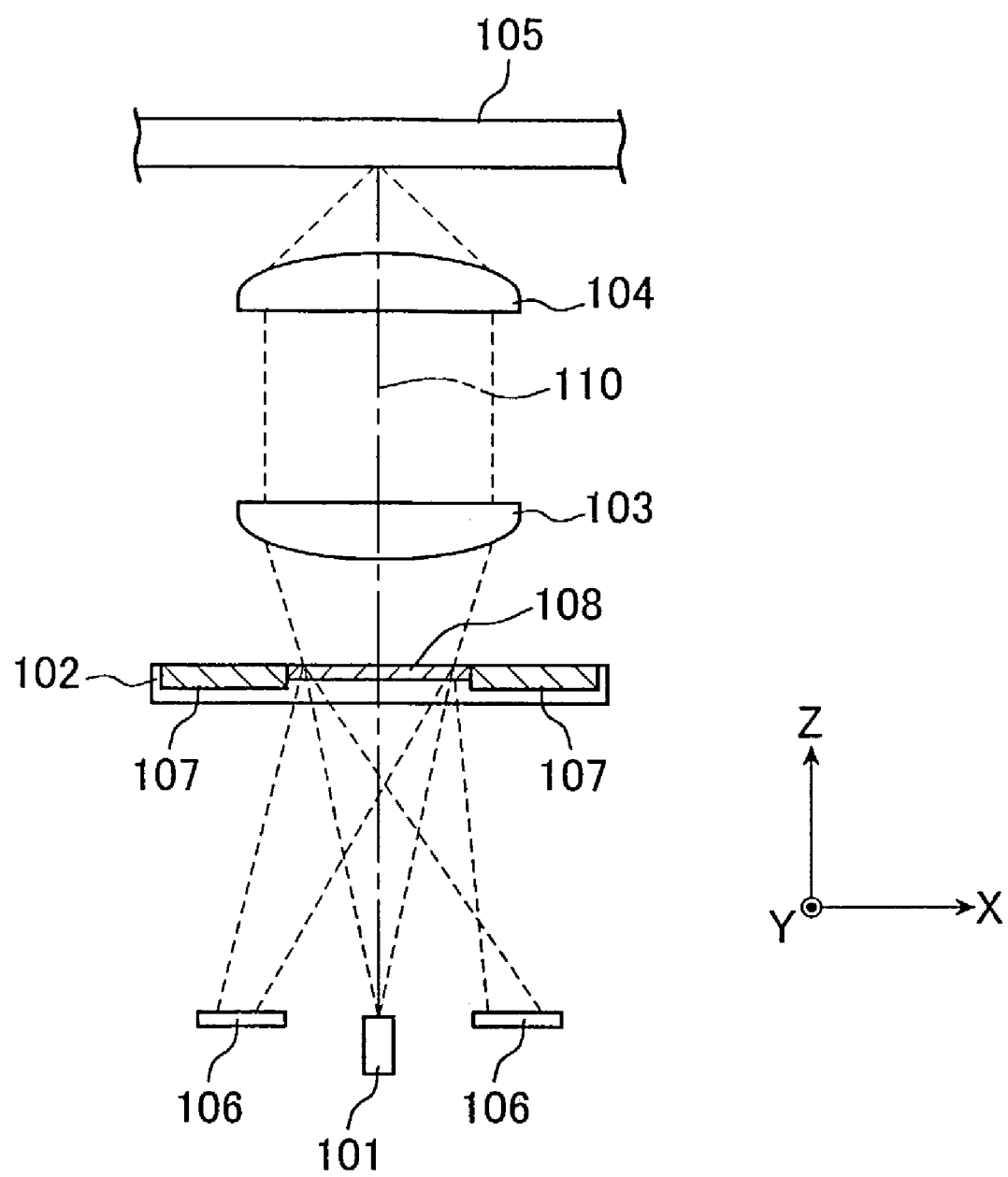
FIG. 1 is a cross-sectional view showing a structure of an optoelectronic device in a first embodiment of the present invention.
Figure 2:
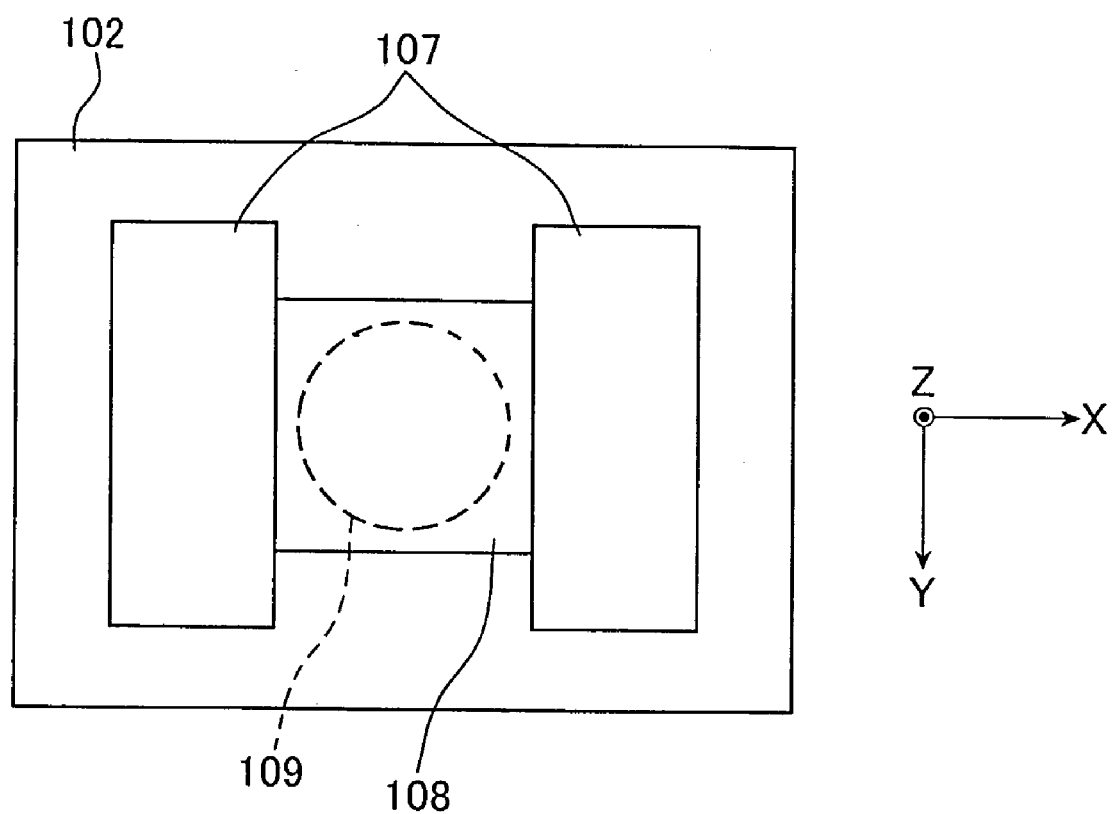
FIG. 2 is a plan view showing a structure of a hologram optical element of the optoelectronic device.

An optoelectronic device in a first embodiment of the present invention comprises, as shown in FIGS. 1 and 2, a semiconductor laser 101 as a light source, a hologram optical element 102 having diffraction grating regions 107 and a diffraction grating region 108, a collimator lens 103, an objective lens 104, and photodetectors 106.

A light beam emitted from the semiconductor laser 101 enters the diffraction grating region 108 of the hologram optical element 102, providing $0^{th}$-order diffracted light that is converged by the collimator lens 103 and the objective lens 104 as a converging means on an information-recording medium 105. Thereby, the reflected light is guided back by the converging means to the diffraction grating region 108 of the hologram optical element 102.

Figure 3:
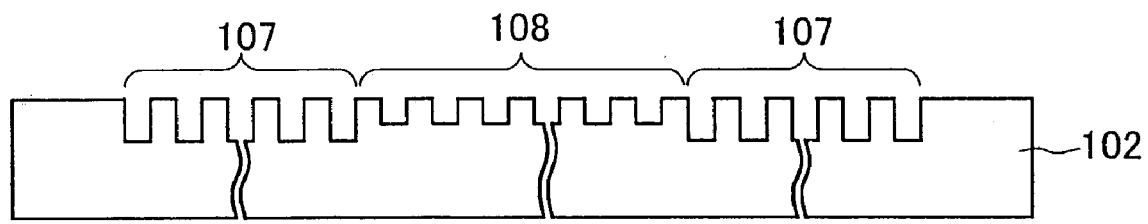
FIG. 3 is a cross-sectional view showing a structural example of the hologram optical element.

Here, an enlarged view of a cross section of the hologram optical element 102 is shown in FIG. 3. The diffraction grating regions 107 and 108 are formed with diffraction gratings different from each other in the depths and/or pitches.

The diffraction grating region 108 is composed of a single or plural diffraction grating pattern(s) providing a lens effect. Reflected light from the information-recording medium 105 is divided at the diffraction grating region 108 so as to provide ±first-order diffracted light that is then converged at the photodetector 106. A reflected light beam guided by the photodetector 106 is calculated and detected for detecting a reproduction signal and various servo signals.

The diffraction grating region 107 has a diffraction grating with a depth determined to be $1/\{2(n-1)\}$ times the wavelength of a laser beam emitted by the semiconductor laser 101, so that a light beam entering the diffraction grating regions 107 will not pass through substantially. Here, 'n' denotes a refractive index of the hologram optical element. In fact, the $0^{th}$-order diffraction efficiency of the diffraction grating regions 107 was not more than 5%.

In FIG. 2, numeral 109 denotes a spot of an effective light beam passing through the diffraction grating region 108. The effective light beam is included in light emitted from the semiconductor laser 101 and it is obtained as light reflected at the information-recording medium 105 and it is obtained from the $0^{th}$-order diffracted light passing through the hologram optical element 102.

As described above, the diffraction grating regions 107 are provided in the vicinity of the diffraction grating regions 108 where the effective light beam enters. The diffraction grating regions 107 function as stray-light-removing regions for removing stray-light other than the above-identified effective light beam, among the reflected light beams from the information-recording medium 105.

The diffraction grating regions 107 are formed to meet the following Formula 1:

$$r > d \cdot \tan(\sin^{-1}(NA)) \quad \text{Formula 1}$$

where 'd' denotes an air conversion distance from a light-emitting point of the semiconductor laser 101 to a face of the hologram optical element 102 where the diffraction grating regions 107/108 are formed along an optical axis 110 connecting the light-emitting point of the semiconductor laser 101 and a converging spot on the information-recording medium 105, NA denotes a numerical aperture of the collimator lens 103 at a side facing the hologram optical element 102, and 'r' denotes a distance between an arbitrary point P on the diffraction grating regions 107 and an intersection between the optical axis 110 and the face of the hologram optical element 102 formed with the diffraction grating regions 107/108.

When a light beam passes through a medium having a refractive index of 'n' and a thickness 't', an air conversion distance 'd' that the light beam progresses is represented as follows:

$$d = t/n.$$

Figure 4:
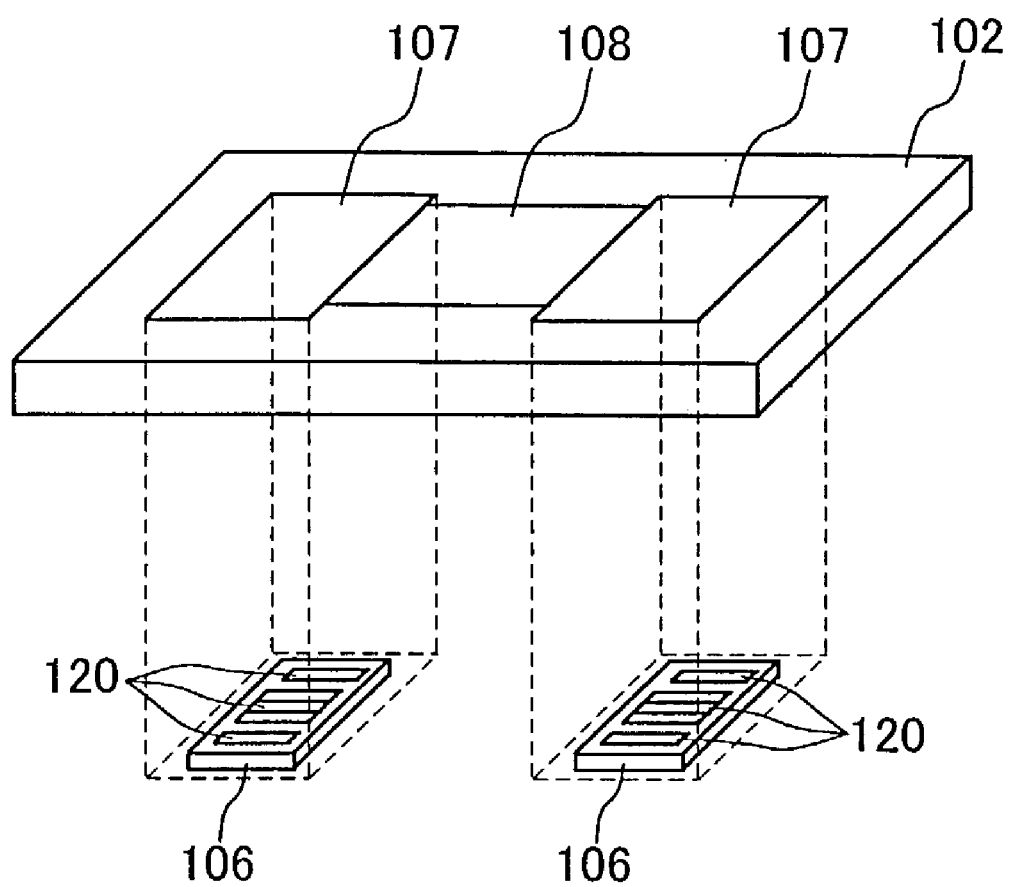
FIG. 4 is a perspective view showing a positional relationship between the hologram optical element and the photodetector in the optoelectronic device.
Figure 5:
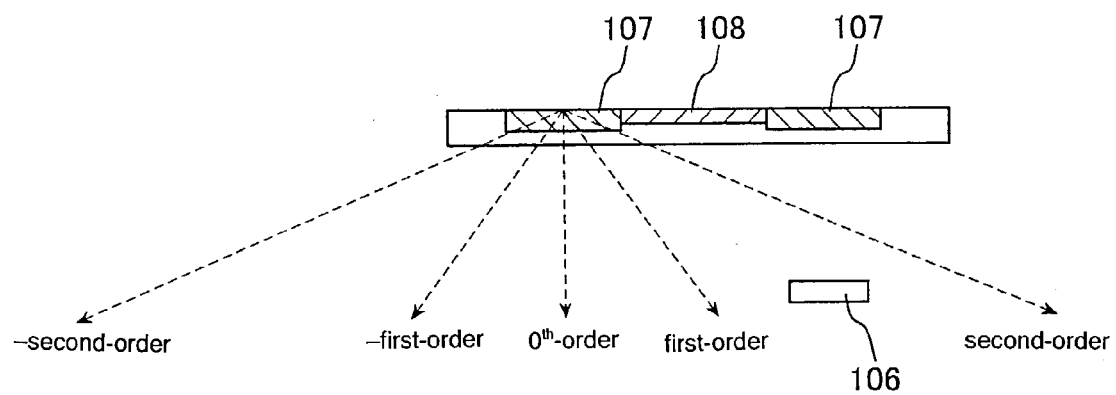
FIG. 5 is an explanatory view showing a positional relationship between the hologram optical element and the photodetector.

The diffraction grating regions 107 are located as shown in FIG. 4 so that at least one (preferably all) of the photodetectors 106 is included in a projection region when the diffraction grating region 107 is projected along the optical axis 110 into a face including the photodetectors 106. The numeral 120 in FIG. 4 denotes a light-receiving element.

Accordingly, as the diffraction grating regions 107 as stray-light-removing regions are formed in the vicinity of the diffraction grating region 108, ±first-order diffracted light that is obtained from the emitted light at the diffraction grating region 108 is prevented from being mixed in $0^{th}$-order diffracted light and from turning into stray light that will enter the photodetectors 106. This enables further suppression of deterioration of the S/N ratio during reproduction of the information-recording medium 105, and thus, provides an optoelectronic device that can provide an excellent reproduction signal and a stable servo-control.

Figure 6:
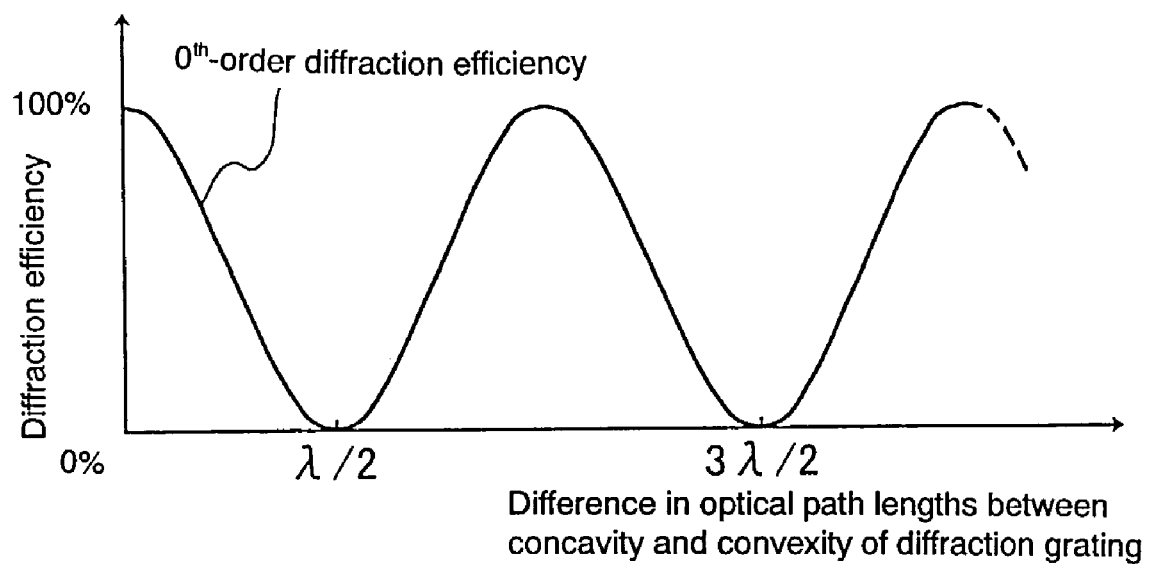
FIG. 6 is a graph showing a diffraction efficiency property of a diffraction grating used for the hologram optical element.

When a plurality of photodetectors 106 are provided as shown in this embodiment, it is preferable that any higher-order diffracted light (diffracted light other than $0^{th}$-order diffracted light) from the diffraction grating regions 107 positioned above the photodetectors 106 is prevented from entering any other photodetectors 106. For this purpose, as shown in FIG. 6, directions and pitches of diffraction gratings of the respective diffraction grating regions 107 are designed so that the higher-order diffracted light is prevented from entering a photodetector 106 located below another diffraction grating region 107. In other words, the direction and pitches of the diffraction grating of each diffraction grating region 107 are determined so that each photodetector 106 is positioned between a spot of $m^{th}$-order diffracted light and a spot of $(m+1)^{th}$-order diffracted light with respect to reflected light from the information-recording medium 105.

Thereby, higher-order diffracted light generated at the diffraction grating regions 107 can be prevented as well from turning into stray light and entering photodetectors 106. As a result, deterioration of the S/N ratio can be suppressed further during reproduction of the information-recording medium 105, providing an optoelectronic device that can provide an excellent reproduction signal and a stable servo-control.

Particularly, since the photodetector 106 is located below the diffraction grating region 107 so as to face the semiconductor laser 101, the reflected light can be prevented from partially turning into stray light and entering the photodetector 106.

Since at least a part of the photodetectors 106 is shielded with a region formed by projecting the diffraction grating region 107 along with the optical axis of the emitted light, the reflected light is prevented from partially turning into stray light and entering the photodetector 106.

Moreover, since among the light beams from the semiconductor laser 101, a light beam entering the collimator lens 103 will not be shielded with the diffraction grating region 107. Therefore, light beams from the semiconductor laser 101 can be used efficiently and the information-recording medium 105 can be irradiated with light beams efficiently.

Furthermore, the diffraction efficiency has a relationship as shown in FIG. 6 with a difference in the optical path lengths between a convexity and concavity of a diffraction grating. The difference in the optical path lengths in the convexity and concavity of diffraction gratings of the diffraction grating region 107 is preferably to be m/2 times a wavelength of the light beam, where m denotes an odd number. Accordingly, a transmittance of $0^{th}$-order light at the diffraction grating region 107 can be decreased to 5% or less, and this can prevent the reflected light from partially turning into stray light and entering a photodetector 106.

Description concerning the first embodiment refers to an infinite optical system comprising both a collimator lens 103 and an objective lens 104. Similar effects are obtainable by using a finite optical system using an objective lens 104 alone.

Figure 7:
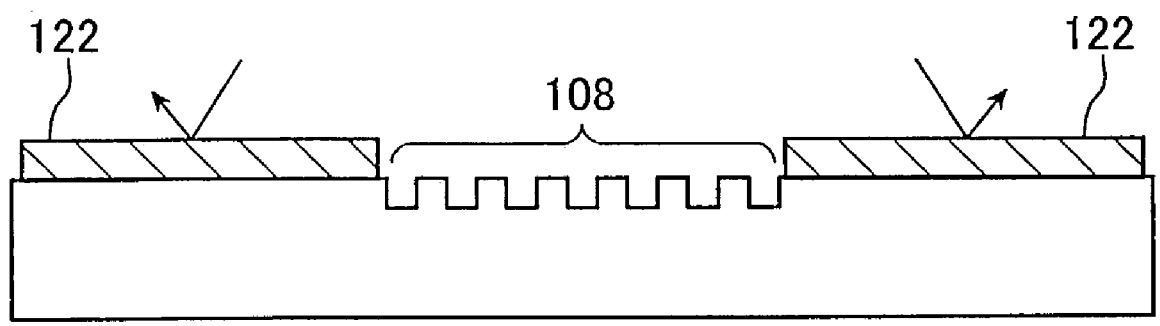
FIG. 7 is a cross-sectional view showing another structural example of the hologram optical element.
Figure 8:
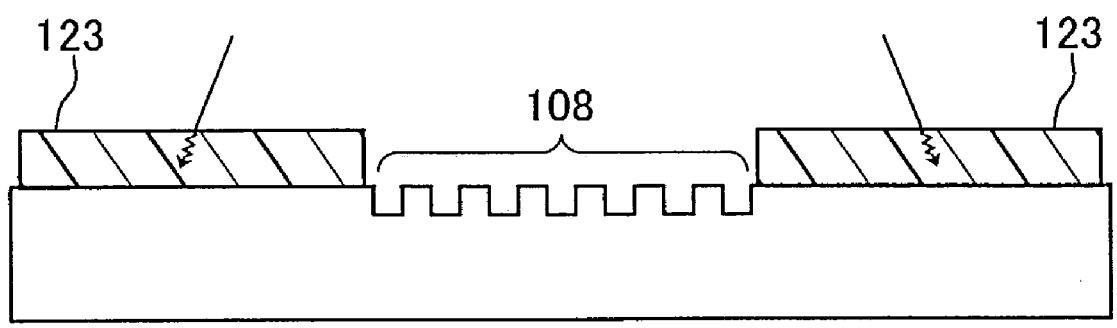
FIG. 8 is a cross-sectional view showing a third structural example of the hologram optical element.

A stray-light-removing region of the present invention is not limited to the above-described diffraction grating region 107, but it can be a shielding region formed of a shielding material. For example, the diffraction grating regions 107 can be replaced by shielding regions 122 as shown in FIG. 7 that are formed of a reflective material such as a metal. Alternatively, as shown in FIG. 8, shielding regions 123 can be formed of a light-absorbing material.

Figure 9:
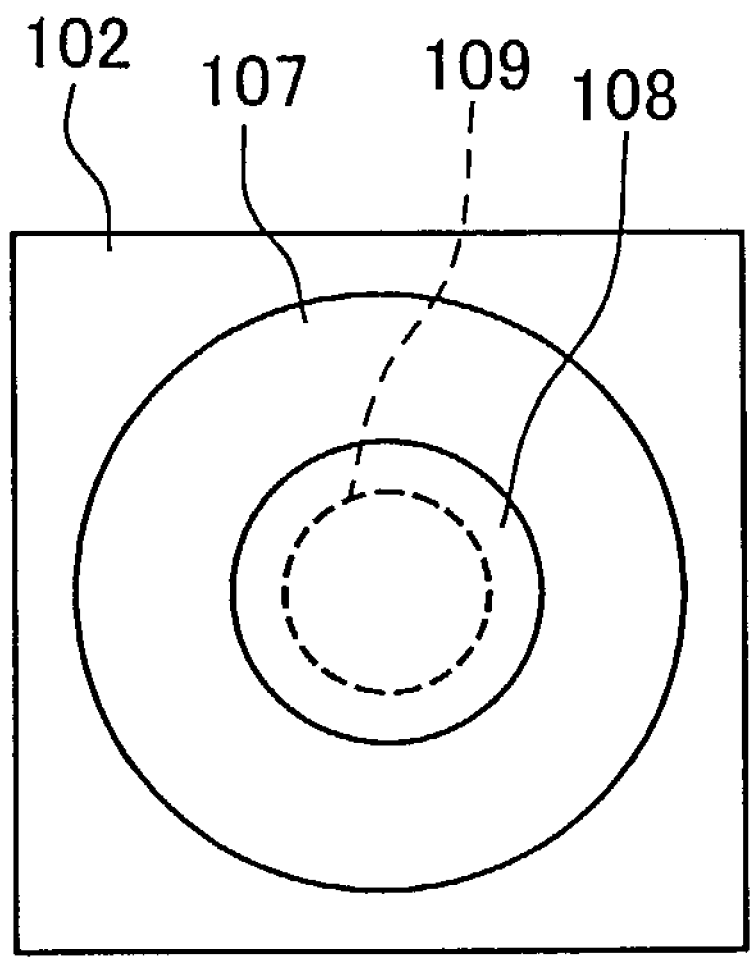
FIG. 9 is a cross-sectional view showing a fourth structural example of the hologram optical element.
Figure 10:
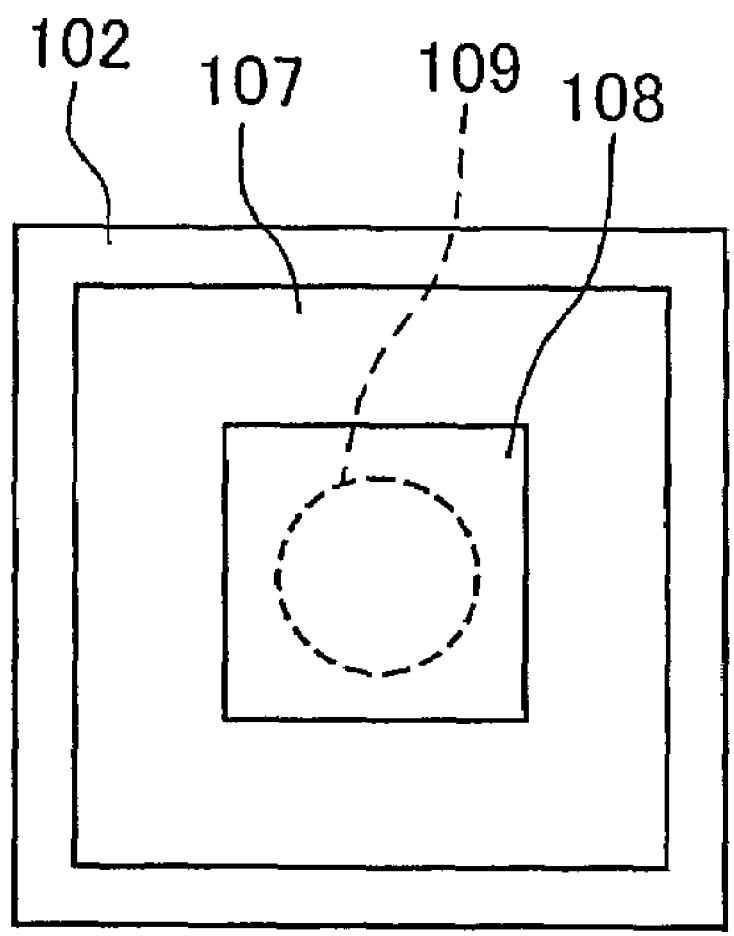
FIG. 10 is a cross-sectional view showing a fifth structural example of the hologram optical element.

The diffraction grating regions 107/108 can be shaped arbitrarily when viewed in the optical axis direction of the effective light beam 109 as long as the diffraction grating region 108 is located to include the effective light beam 109 while the diffraction grating regions 107 are located in the vicinity of the diffraction grating region 108 or adjacent to the diffraction grating region 108 with no spacing as shown in FIGS. 9 and 10.

Second Embodiment

Figure 11:
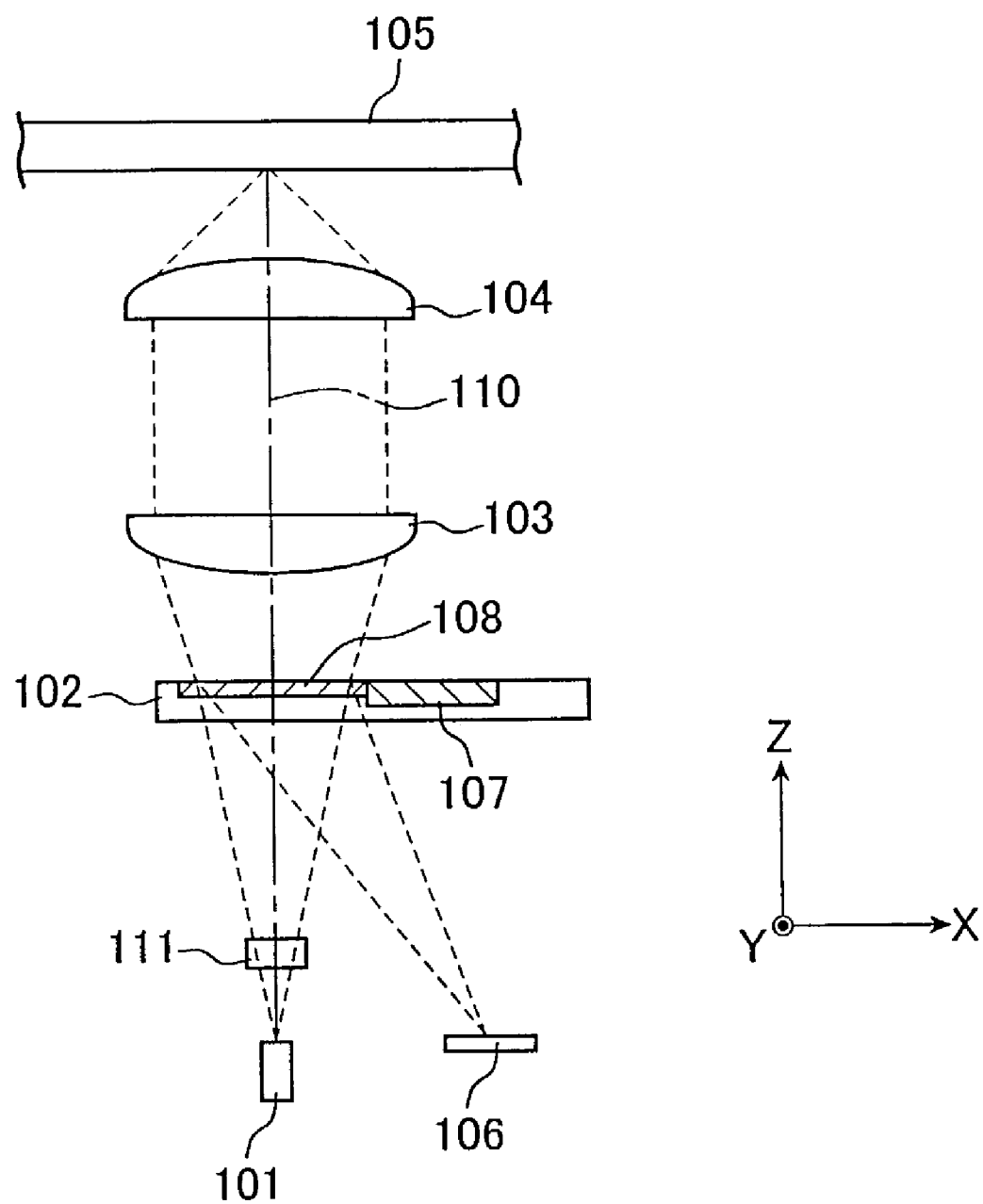
FIG. 11 is a cross-sectional view showing a structure of an optoelectronic device in a second embodiment of the present invention.

An optoelectronic device in a second embodiment is distinguished from the optoelectronic device described in the first embodiment in that a three-beam-generating diffraction grating element 111 is located in an optical path between a semiconductor laser 101 and a hologram optical element 102 as shown in FIG. 11, and one photodetector 106 is used for detecting a tracking servo signal by a three-beam method.

Figure 12:
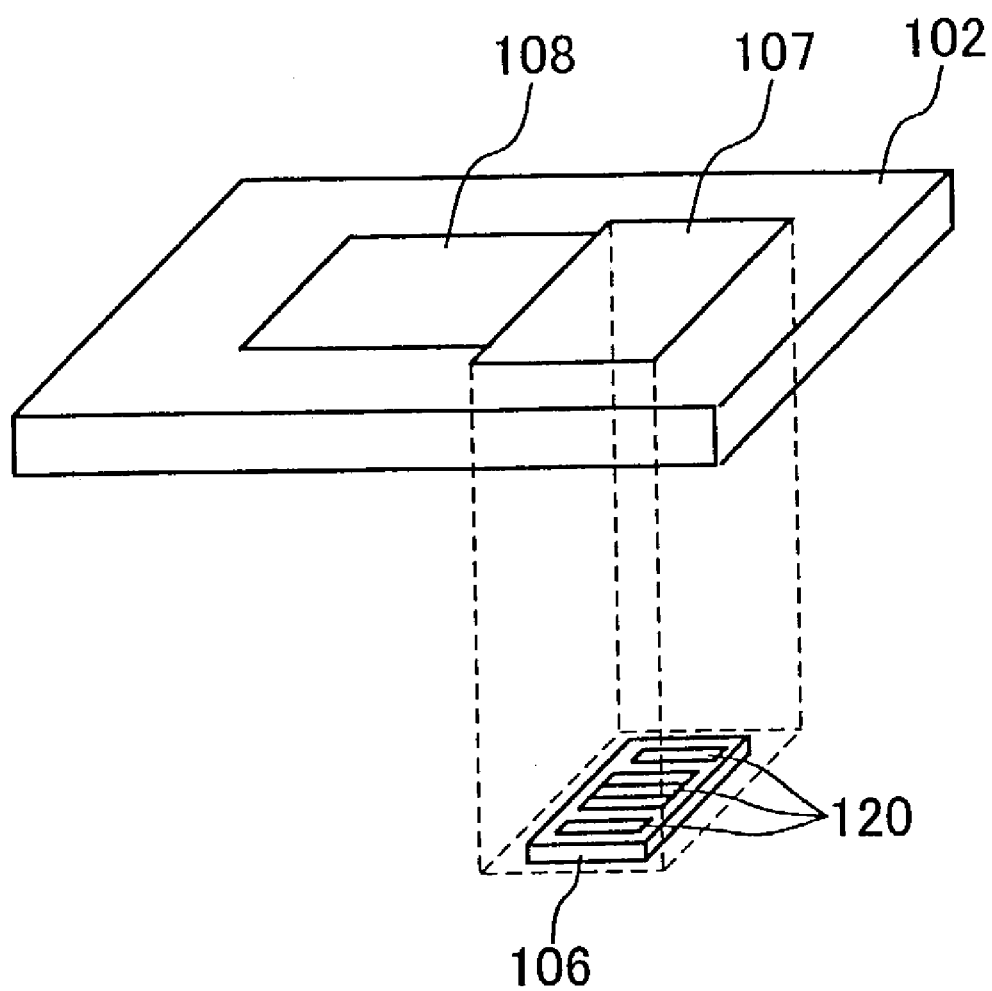
FIG. 12 is a perspective view showing a positional relationship between a hologram optical element and a photodetector in an optoelectronic device of the second embodiment.

Since the optoelectronic device in the second embodiment comprises a single photodetector 106 as shown in FIG. 12, the diffraction grating region 107 of the hologram optical element 102 is provided adjacent to only one side of the diffraction grating region 108. The photodetector 106 is located to be included at least partially (or entirely in a preferred example) in a region provided by projecting the diffraction grating region 107 along the optical axis 110.

Accordingly, similar to the first embodiment, deterioration of the S/N ratio can be suppressed during reproduction at the information-recording medium 105 and the optoelectronic device in this embodiment can have a servo control more stable than that of the optoelectronic device in the first embodiment due to the three-beam method.

Similar to the first embodiment, the stray-light-removing region of the hologram optical element 102 is not limited to the diffraction grating region 107, but it can be a shielding region 122 of a reflective material like a metal or a shielding region 123 of a light-absorbing material as shown in FIGS. 7 and 8.

Third Embodiment

Figure 13:
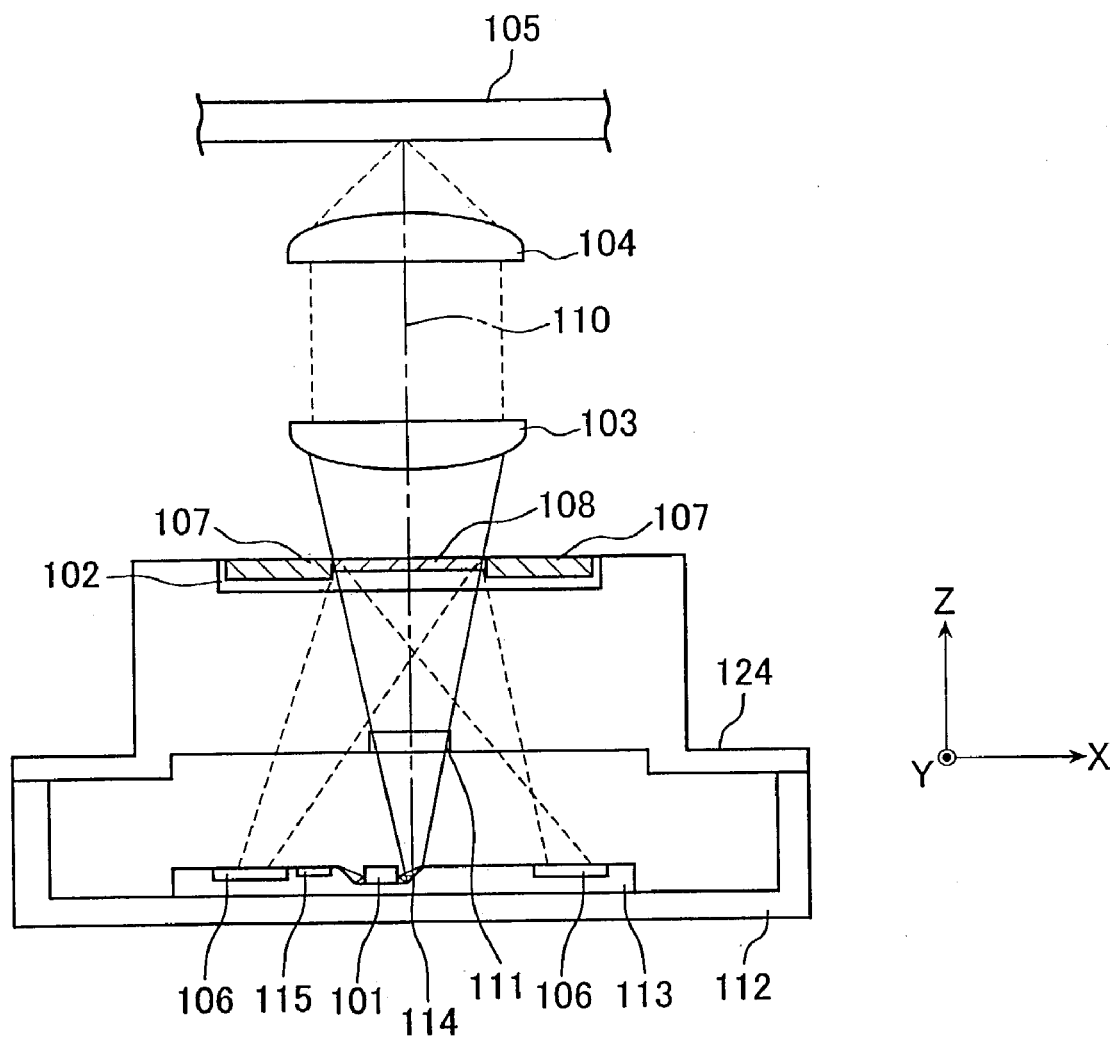
FIG. 13 is a cross-sectional view showing a structure of an optoelectronic device in a third embodiment of the present invention.
Figure 14:
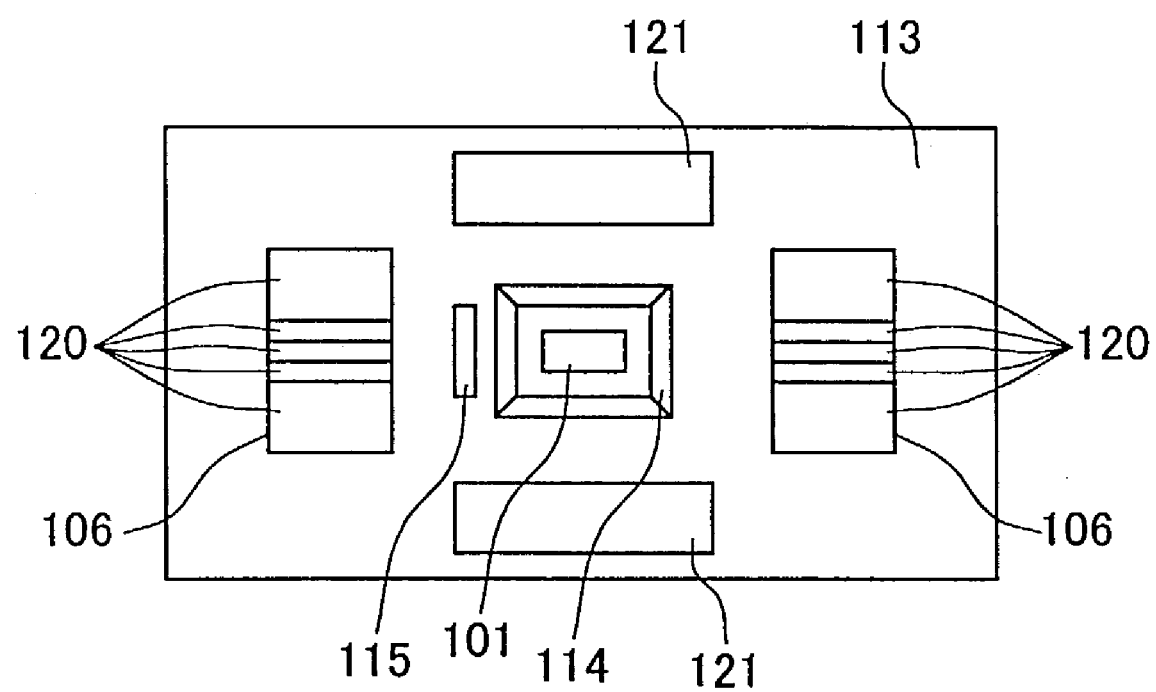
FIG. 14 is a plan view showing a structure of an integrated board composing the optoelectronic device of the third embodiment.

An optoelectronic device in a third embodiment of the present invention has a structure as shown in FIGS. 13 and 14. Specifically, a semiconductor laser 101 and photodetectors 106 are mounted integrally on the same substrate (substrate 113) and located in a package 112, and the package 112 is sealed with an optical part 124 prepared by integrating a three-beam-generating diffraction grating element 111 and a hologram optical element 102.

The substrate 113 is dented by means of a semiconductor fine processing technology. The semiconductor laser 101 is chip-bonded to the bottom of the concavity. In a typical example where an end-face light emitter is used for the semiconductor laser 101, light emitted from the end face of the semiconductor laser 101 should be directed to the information-recording medium 105. For this purpose, the concavity has a side face inclined by about 45° with respect to the bottom, and a metal, dielectric film or the like is deposited on the side face so as to form a micro-mirror 114.

When the semiconductor laser 101 is an end-face light-emitting type, preferably it comprises a monitoring photodetector 115 for receiving light emitted toward a side opposite to the micro-mirror 114 so as to adjust the output of the semiconductor laser 101. This structure serves to adjust the optical output of the semiconductor laser 101 to keep the optimum condition, and to suppress excessive power consumption caused by excessive optical output.

Similar to the first and second embodiments, the diffraction grating regions 107/108, the three-beam-generating diffraction grating element 111, and the photodetectors 106 are located to prevent ±first-order diffracted light generated out of the emitted light at the diffraction grating region 108 from being mixed in $0^{th}$-order diffracted light and turning into stray light that will enter the photodetectors 106.

As a result, deterioration of the S/N ratio can be suppressed during reproduction, providing an optoelectronic device that can provide an excellent reproduction signal and a stable servo-control.

Furthermore, since the semiconductor laser 101 and the photodetectors 106 are located together in a package 112 and the package 112 is sealed with an optical part 124 formed by monolithically integrating the three-beam-generating diffraction grating element 111 and the hologram optical element 102, the reliability of the optoelectronic device can be improved considerably.

Particularly, since the semiconductor laser 101 and the photodetectors 106 are monolithically integrated on the same substrate 113, a small and thin optoelectronic device can be provided.

As shown in FIG. 14, integrated circuits 121 can be integrated on the substrate 113 so as to convert or calculate the current and voltage of the electric signals from the photodetectors 106 by using the semiconductor fine processing technology.

Accordingly, any external noises caused by wire-routing can be reduced when compared to a case of providing a circuit for processing electric signals outside the substrate 113 and connecting the circuit and the substrate 113 using wires. As a result, the obtained optoelectronic device will have a further improved S/N ratio.

This integration can be performed in a hybrid manner, i.e., by forming all photodetectors 106 on a silicon substrate by the semiconductor fine processing technology before chip-bonding the semiconductor laser 101. Alternatively, a semiconductor hetero-epitaxial technique can be used to form a compound semiconductor layer monolithically, and the semiconductor laser 101 and all photodetectors 106 can be formed on either a silicon substrate or a compound semiconductor layer. Alternatively, no silicon substrates are used but only a compound semiconductor layer is used for monolithically integrating the semiconductor laser 101 and all the photodetectors 106.

When the semiconductor laser 101 and the photodetectors 106 are integrated in a hybrid manner, the semiconductor laser 101 can be a face light-emitting type for emitting light from the upper surface. In this case, the micro-mirror 114 can be omitted as long as the semiconductor laser 101 is chip-bonded with its light-emitting face directed upwards.

In this structure, the stray-light-removing region of the hologram optical element 102 is not limited to the diffraction grating regions 107. It can comprise shielding regions 122 formed of a reflective material such as a metal, or shielding regions 123 formed of a light-absorbing material as shown in FIG. 7 or 8 regarding the first embodiment.

Fourth Embodiment

Figure 15:
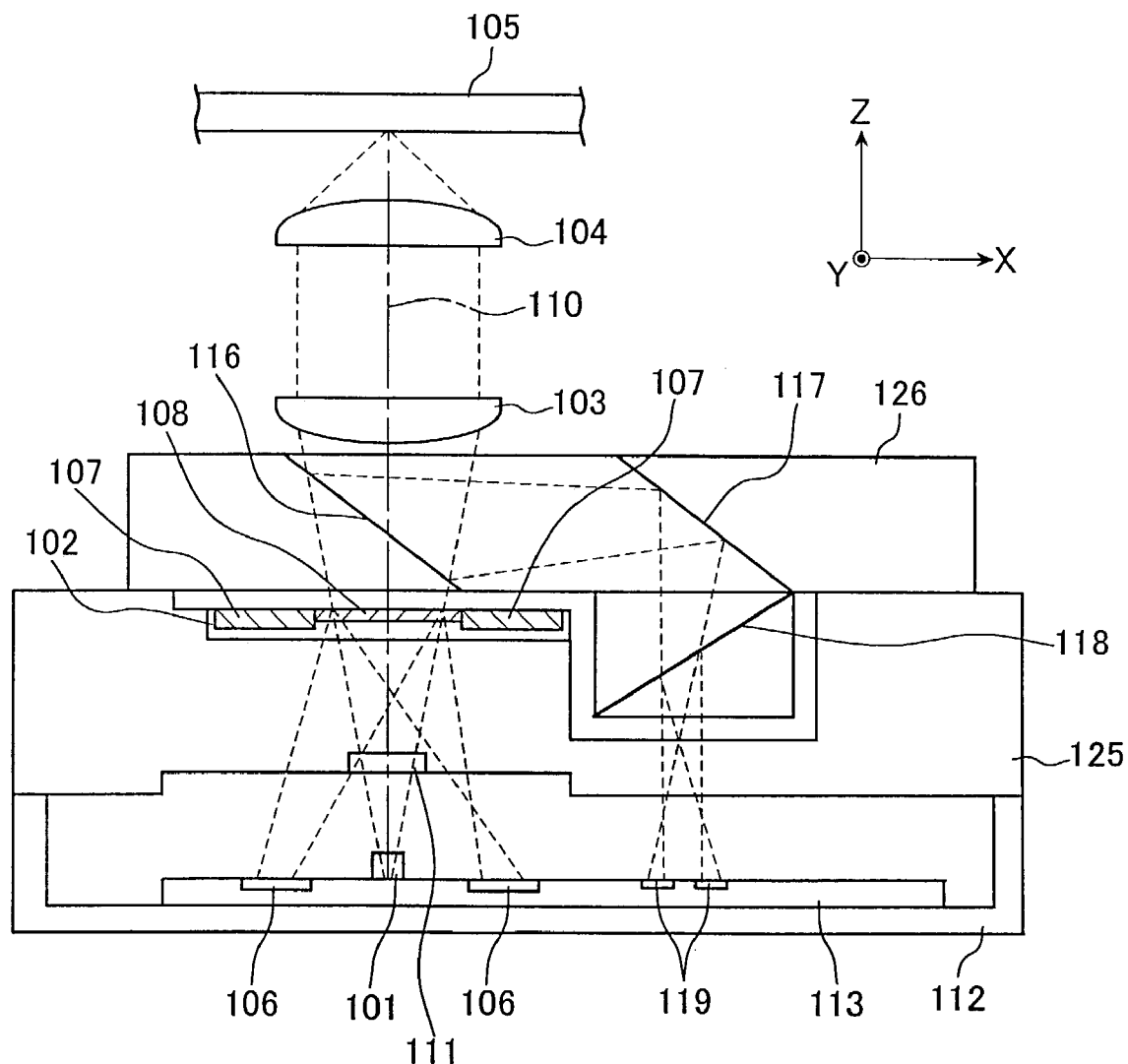
FIG. 15 is a cross-sectional view showing a structure of an optoelectronic device in a fourth embodiment of the present invention.
Figure 16:
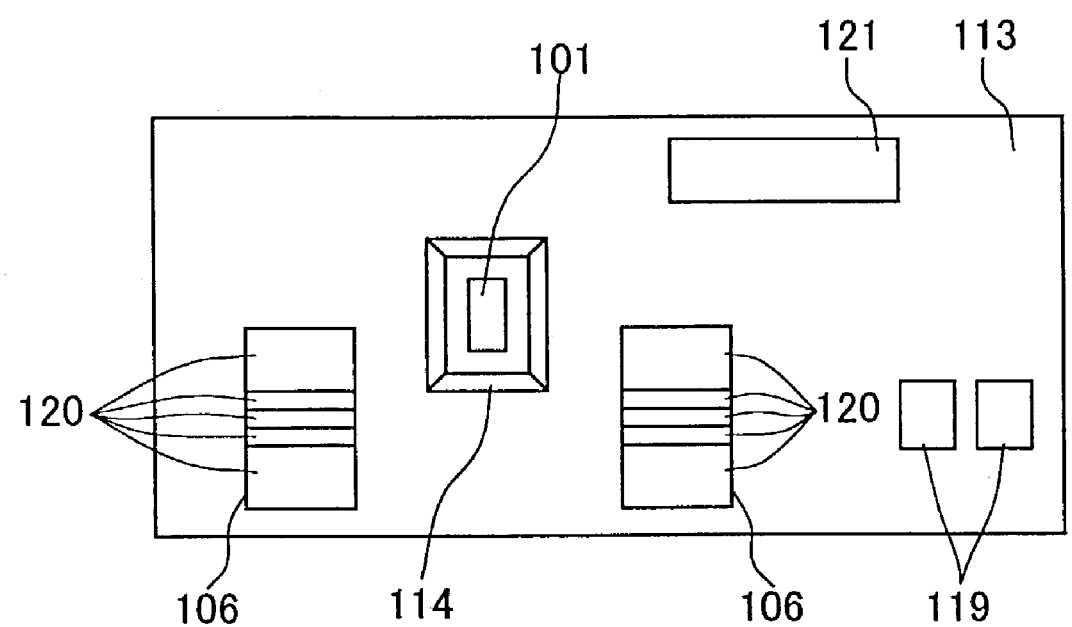
FIG. 16 a plan view showing a structure of an integrated board composing the optoelectronic device of the fourth embodiment.
Figure 17:
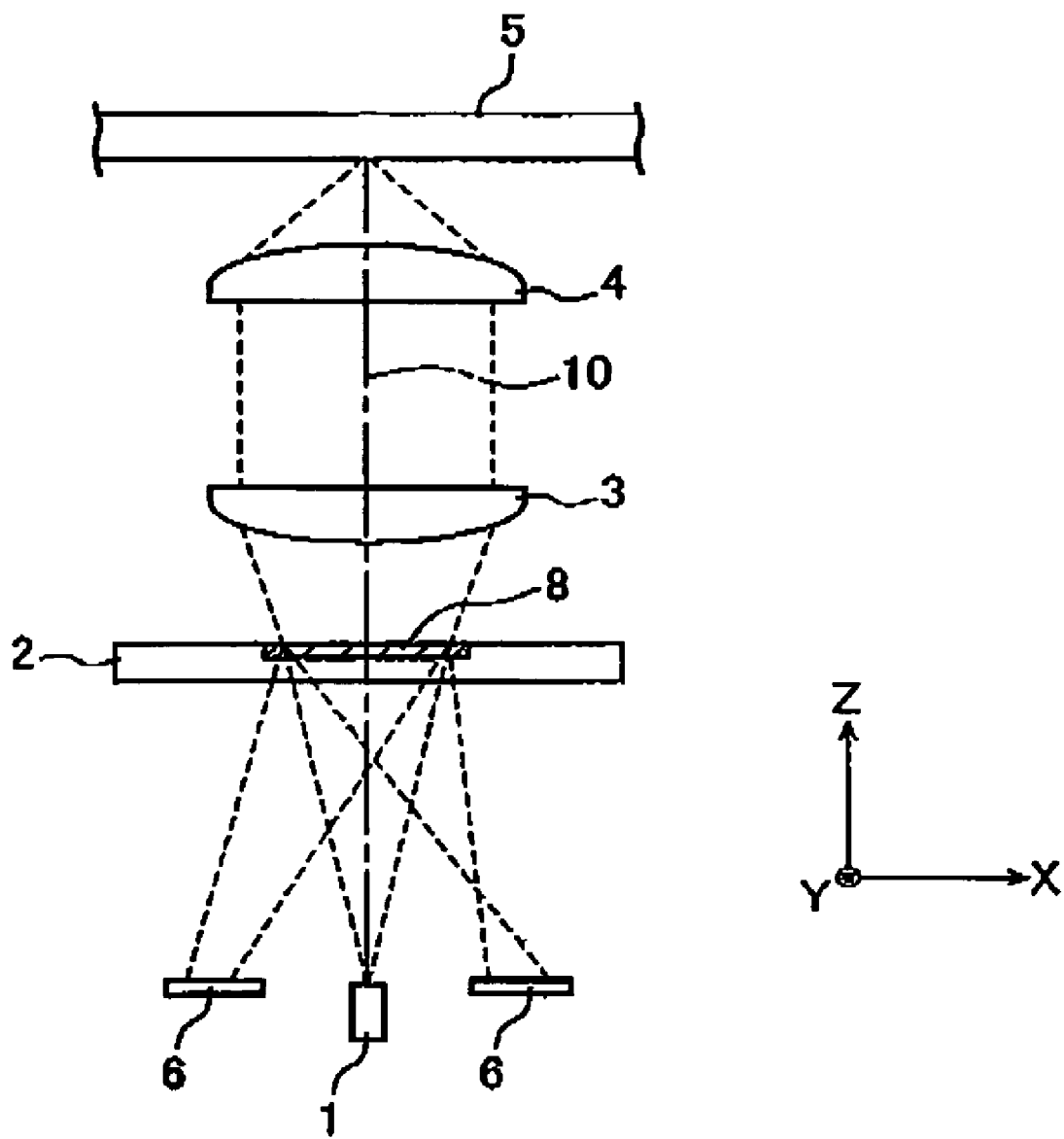
FIG. 17 is a cross-sectional view showing a structure of a conventional optoelectronic device.
Figure 18:
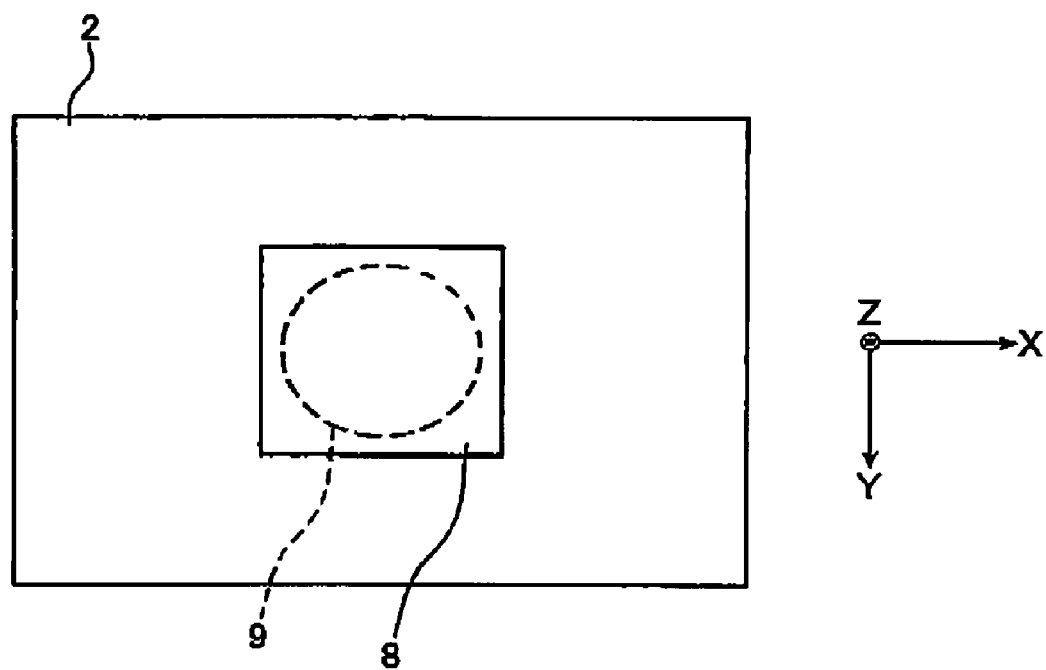
FIG. 18 is a plan view showing a structure of a hologram optical element composing the conventional optoelectronic device.
Figure 19:
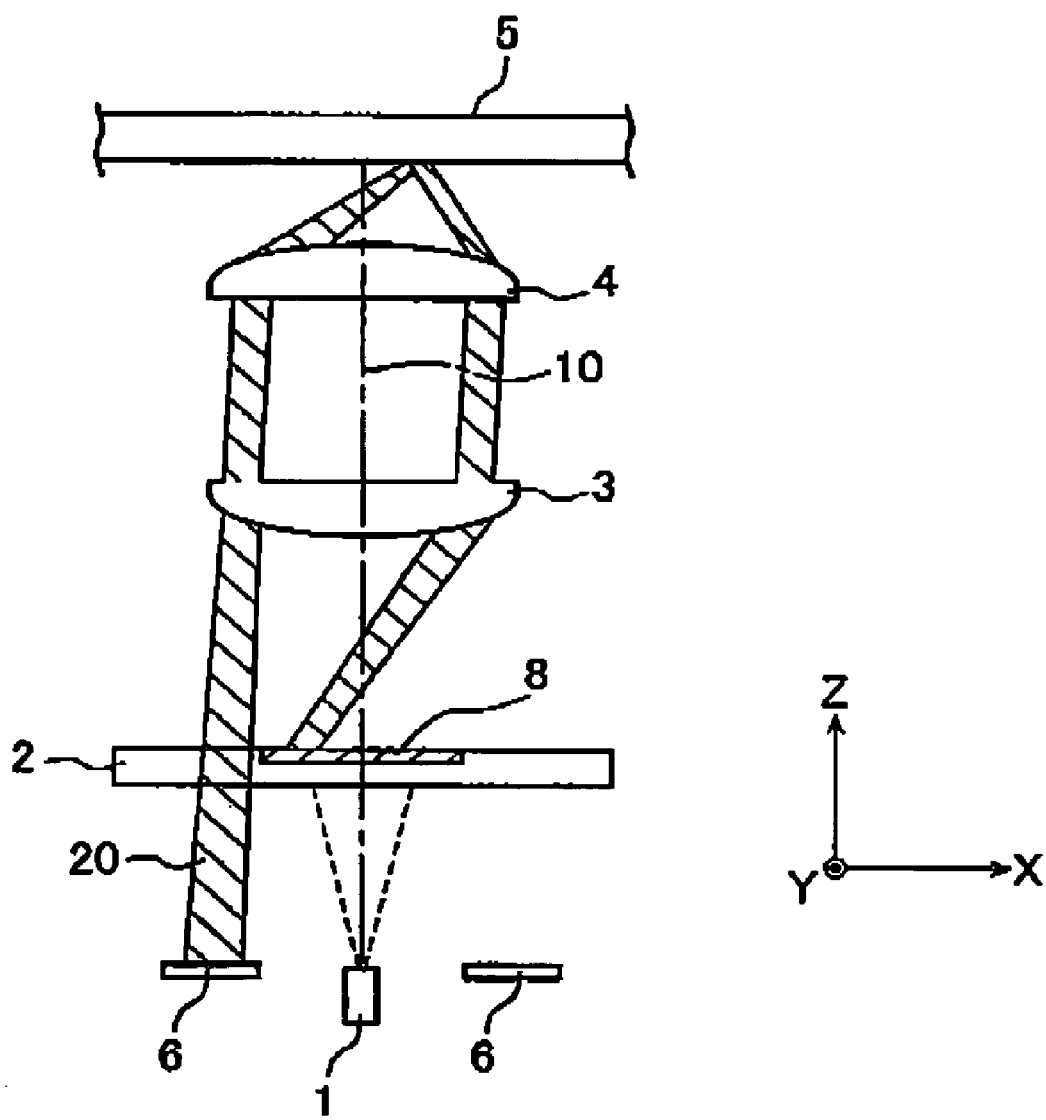
FIG. 19 is a schematic view showing a conventional optoelectronic device where stray light enters the photodetector.

An optoelectronic device according to a fourth embodiment of the present invention has a structure as in the third embodiment, and it further comprises a polarized-light-beam-dividing means 116, a reflector, 117, a polarized-light-separating means 118 and a polarization-signal-detecting photodetector 119, which are shown in FIGS. 15 and 16 respectively.

The polarized-light-beam-dividing means 116, the reflector 117 and the polarized-light-separating means 118 are integrally formed as an optical member 126. The polarized-light-beam-dividing means 116 can be a polarized-light-beam splitter or the like, the reflector 117 can be a mirror or the like, and the polarized-light-separating means 118 can be a Wollaston prism or the like.

The semiconductor laser 101, the photodetector 106 and the polarization-signal-detecting photodetector 119 are integrated on a substrate 113. The substrate 113 is located inside a package 112. The package 112 is sealed with an optical part 125 prepared by integrating a three-beam-generating diffraction grating 111 and a hologram optical element 102. The optical member 126, which is prepared by integrally assembling the above-described polarized-light-beam-dividing means 116 and the like, is mounted on the optical part 125.

Since a polarized-light-beam-dividing means 116, a reflector 117, a polarized-light-separating means 118 and a polarization-signal-detecting photodetector 119 are arranged in this manner, photo-magnetic signals can be detected.

The optoelectronic device can be reduced in the size and thickness and also the production cost can be reduced by 1) integrating on one substrate 113 a semiconductor laser 101, a photodetector 106 and a polarization-signal-detecting photodetector 119; 2) integrating in one optical part 125 a three-beam-generating diffraction grating element 111 and a hologram optical element 102; and 3) monolithically integrating as an optical member 126 a polarized-light-beam-dividing means 116, a reflector 117, a polarized-light-separating means 118.

Furthermore, since the optical part 125 seals the package 112 having the substrate 113 in the interior of the package 112, precision parts such as the semiconductor laser 101 and the photodetectors 106 can be protected from changes in humidity and temperature and from dust pollution. Accordingly, reliability of the optoelectronic device can be improved considerably.

Photo-magnetic signals can be detected using this optoelectronic device. Specifically, a reflected light beam from the information-recording medium 105 enters the polarized-light-beam-dividing means 116 so as to be divided and directed to the hologram optical element 102 and to the reflector 117.

As mentioned above, the reflected light beam divided in the direction to the hologram optical element 102 is diffracted and converged at the photodetector 106 by the diffraction grating region 108 of the hologram optical element 102 so that the servo-signals are calculated and detected. On the other hand, a part of returning light divided by the polarized-light-beam-dividing means 116 is directed to the reflector 117. The light beam is reflected at the reflector 117 and further polarized at the polarized-light-separating means 118 into P polarized light and S polarized light to be guided to the polarization-signal-detecting photodetector 119 where the reproduction signal is calculated and detected.

As shown in FIG. 16, an integrated circuit 121 can be integrated on the substrate 113 by using a semiconductor fine processing technology, and the integrated circuit 121 is used for current/voltage-converting electric signals provided by the photodetector 106.

In this structure, the stray-light-removing region of the hologram optical element 102 is not limited to the diffraction grating regions 107. It can comprise shielding regions 122 formed of a reflective material such as a metal, or shielding regions 123 formed of a light-absorbing material as shown in FIG. 7 or 8 regarding the first embodiment.

The semiconductor laser 101 exemplified in this embodiment is an end-face light-emitting semiconductor laser. This can be replaced by a face light-emitting semiconductor laser as described in the third embodiment. In this case, the micro-mirror 114 can be omitted as long as the semiconductor laser 101 is chip-bonded with its light-emitting face directed upwards.

The respective embodiments relate to a use for mainly detecting optical signals from an information-recording medium. However, the present invention can be applied for optical communications and other optical information processing systems as well.

INDUSTRIAL APPLICABILITY

As mentioned above, the present invention can prevent deterioration of S/N ratio caused by stray light, and thus an optoelectronic device according to the present invention can provide improved quality of a reproduction signal and a stable servo control.

The invention claimed is:

1. An optoelectronic device comprising:
   a light emitter for emitting a light beam on a reflection medium, a light-beam-dividing element having a first diffraction grating region and a second diffraction grating region located in the vicinity of the first diffraction grating region, being located between the light emitter and the reflection medium, and a photodetector for receiving light diffracted at the diffraction grating region of the light-beam-dividing element, among returning light beams reflected by the reflection medium, wherein
   an entire light beam emitted from the light emitter enters the first diffraction grating region and is reflected by the reflection medium, whereby the photodetector receives only a portion of the returning light that passes through the first diffraction grating region,
   the second diffraction grating region prevents the portion of the returning light beams which enters the second diffraction grating region from entering the photodetector, where the returning light beams are ±first order diffracted light generated when a light beam emitted from the light emitter enters the first diffraction grating region and is reflected by the reflection medium, and
   the second diffraction grating region prevents the light beam emitted from the light emitter from reaching the reflection medium.

2. The optoelectronic device according to claim 1, wherein the second diffraction grating region has a $0^{th}$-order diffraction efficiency of light reflected by the reflection medium that is 5% at most.

3. The optoelectronic device according to claim 1, wherein the light-beam-dividing element has a lens at a side opposite to the light emitter, and the second diffraction grating region is provided so as to satisfy the formula:

$$r > d \cdot \tan(\sin^{-1}(NA))$$

where 'd' denotes an air conversion distance from a light-emitting point of the light emitter to a face of the light-beam-dividing element where the first diffraction grating region and the second diffraction grating region are formed, NA denotes a numerical aperture at a side of the lens facing the light-beam-dividing element, and 'r' denotes a distance to an arbitrary point P on the second diffraction grating region from an intersection of an optical axis of the light beam provided by the light emitter and a face of the light-beam dividing element at a side with the second diffraction grating region.

4. The optoelectronic device according to claim 1, wherein at least one part of the photodetector is present in a region obtained by projecting the second diffraction grating region along with the optical axis of the returning light beam.

5. The optoelectronic device according to claim 1, wherein the first diffraction grating region and the second diffraction grating region are located adjacent to each other with no spacing.

6. The optoelectronic device according to claim 1, wherein a three-beam-generating diffraction grating is provided in an optical path between the light emitter and the light-beam-dividing element.

7. The optoelectronic device according to claim 6, wherein the three-beam-generating diffraction grating and the light-beam-dividing element are integrated within one optical part.

8. The optoelectronic device according to claim 6, comprising a polarized-light-beam divider for dividing a part of light reflected by the reflection medium, a reflector for reflecting light divided by the polarized-light-beam divider, a polarized-light separator for separating light reflected by the reflector, and a polarization-signal-detecting photodetector for detecting light separated by the polarized-light separator.

9. The optoelectronic device according to claim 8, wherein the polarized-light-beam divider, the reflector and the polarized-light separator are monolithically integrated to form one optical member.

10. The optoelectronic device according to claim 1, wherein the light emitter, the photodetector and the light-beam-dividing element are provided within one single package.

11. The optoelectronic device according to claim 10, wherein the light emitter and the photodetector are integrated on one substrate located inside the package that is sealed with a member provided with the light-beam-dividing element.

12. The optoelectronic device according to claim 11, wherein the light emitter is an end-face light emitter, the substrate has a concavity with a bottom on which the light emitter is located while the side-face of the concavity comprises a mirror inclined by about 45° with respect to the bottom so as to reflect a light beam emitted from the light emitter.

13. The optoelectronic device according to claim 12, further comprising a monitor for receiving a light beam emitted from the light emitter to a side opposite to the mirror and adjusting output of the light emitter.

14. The optoelectronic device according to claim 11, wherein an integrated circuit for processing an electric signal from the photodetector is mounted on the substrate.

15. An optoelectronic device comprising:
    a light emitter for emitting a light beam on a reflection medium, a light-beam-dividing element having a first diffraction grating region and a second diffraction grating region located in the vicinity of the first diffraction grating region, being located between the light emitter and the reflection medium, and a photodetector for receiving light diffracted at the diffraction grating region of the light-beam-dividing element, among returning light beams reflected by the reflection medium, wherein an entire light beam emitted from the light emitter enters the first diffraction grating region and is reflected by the reflection medium, whereby the photodetector receives only a portion of the returning light that passes through the first diffraction grating region, the second diffraction grating region prevents the portion of the returning light beam which enters the second diffraction grating region from entering the photodetector, where the returning light beams are ±first order diffracted light generated when a light beam emitted from the light emitter enters the first diffraction grating region and is reflected by the reflection medium, the second diffraction grating region has a $0^{th}$-order diffraction efficiency of light reflected by the reflection medium that is 5% at most, and the second diffraction grating region has a convexity and a concavity different from each other in the optical path length by m/2 times a wavelength of the reflected light, where m denotes an odd number.

16. An optoelectronic device comprising:

a light emitter for emitting a light beam on a reflection medium;

a light-beam-dividing element having a first diffraction gating region and a second diffraction grating region located in the vicinity of the first diffraction grating region, being located between the light emitter and the reflection medium;

a photodetector for receiving light diffracted at the diffraction grating region of the light-beam-dividing element, among returning light beams reflected by the reflection medium; and a plurality of photodetectors, each of which is located between a spot of $m^{th}$-order diffracted light and a spot of $(m+1)^{th}$-order diffracted light of the returning light beam provided by second diffraction grating region located in an optical axis direction of the returning light beam with respect to the other photodetector, where m denotes an integer, wherein an entire light beam emitted from the light emitter enters the first diffraction grating region and is reflected by the reflection medium, whereby the photodetector receives only a portion of the returning light that passes through the first diffraction grating region, the second diffraction grating region prevents the portion of the returning light beam which enters the second diffraction grating region from entering the photodetector, where the returning light beams are ±first order diffracted light generated when a light beam emitted from the light emitter enters the first diffraction grating region and is reflected by the reflection medium, and the second diffraction grating region has a $0^{th}$-order diffraction efficiency of light reflected by the reflection medium that is 5% at most.

* * * * *